Patented Oct. 17, 1922.

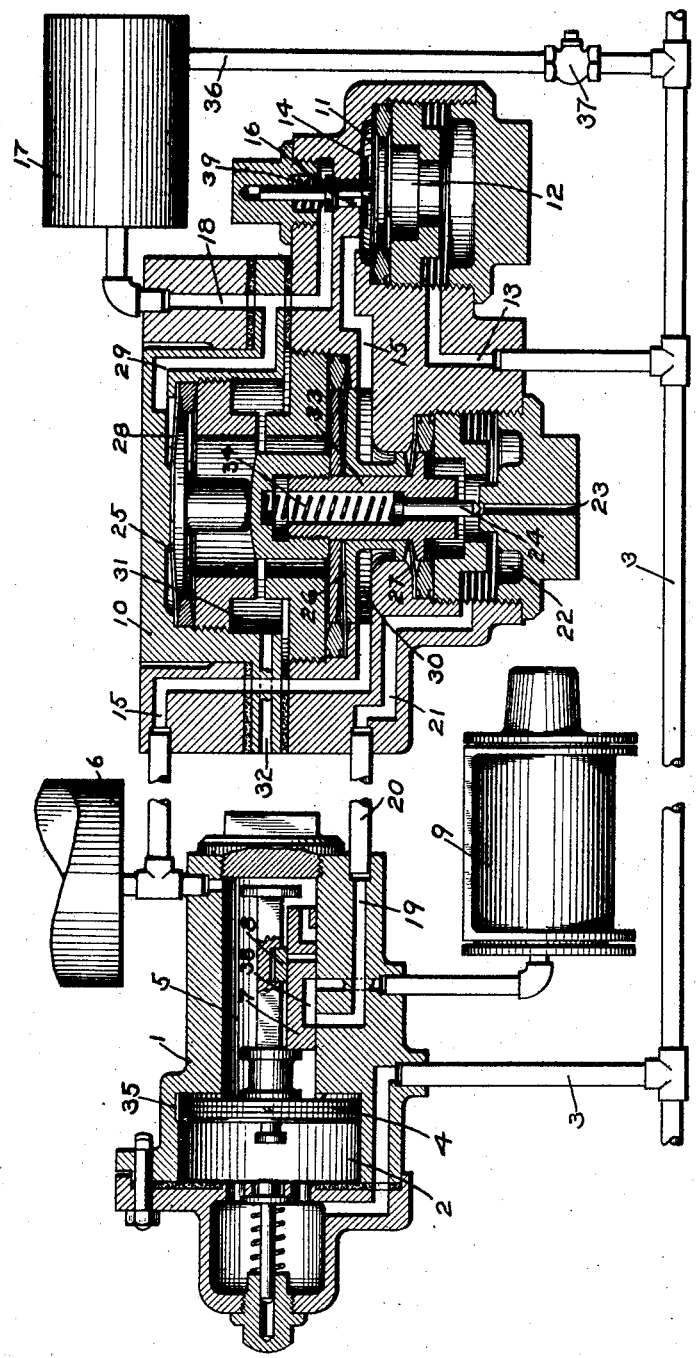

1,432,427

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed December 21, 1920. Serial No. 432,236.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to means for effecting the gradual release of the brakes and the recharge of the auxiliary reservoir.

The principal object of my invention is to provide means for graduating the release of the brakes in which the auxiliary reservoir is recharged at a rate corresponding with the rate at which fluid is released from the brake cylinder.

In the accompanying drawing, the single figure is a diagrammatic view, mainly in section, of a fluid pressure brake equipment embodying my invention.

As shown in the drawing, the brake equipment may comprise a triple valve device 1 having a piston chamber 2 connected to the brake pipe 3 and containing piston 4, and a valve chamber 5, connected to the auxiliary reservoir 6, and containing a main slide valve 7 and a graduating slide valve 8 adapted to be operated by piston 4 for controlling the admission and release of fluid under pressure to and from a brake cylinder 9.

According to my invention, a valve device 10 for graduating the release of the brakes is provided and comprises a casing containing a diaphragm 11 having a chamber 12 at one side connected by pipe and passage 13 with the brake pipe 3 and a chamber 14 at the opposite side connected by passage 15 to the auxiliary reservoir 6.

The movement of diaphragm 11 operates a valve 16 for controlling communication from a supplemental reservoir 17 through passage 18 to chamber 14 and passage 15.

The exhaust passage 19 of the triple valve device 1 is connected by pipe 20 and passage 21 to a chamber 22 in the valve device 10 and communication from chamber 22 to an atmospheric exhaust passage 23 is controlled by a valve 24.

The operation of valve 24 is controlled by the action of a set of three diaphragms 25, 26, and 27, having differential areas, the area of diaphragm 26 being greater than the area of diaphragms 27 and the area of the diaphragm 25 being preferably intermediate the areas of the diaphragms 26 and 27.

The chamber 28 at one side of the diaphragm 25 is constantly subject to the fluid pressure in the supplemental reservoir 17, as supplied through passages 18 and 29, the chamber 30 intermediate the diaphragms 26 and 27 is subject to the fluid pressure in the auxiliary reservoir 6, the diaphragm 27 is subject on one side to the pressure in the triple valve exhaust chamber 22, and the chamber 31 intermediate the diaphragms 25 and 26 is open to the atmosphere by way of a passage 32.

The valve 24 is movably mounted in the valve stem 33 and is acted upon by a spring 34, thus permitting the valve to find its seat, in spite of any inaccuracies in machining or in assembling the parts.

In operation, the auxiliary reservoir is normally charged with fluid under pressure supplied from the brake pipe 3 through the usual feed groove 35, and the supplemental reservoir 17 may be charged from the brake pipe by way of pipe 36 containing a non-return check valve 37.

The brake pipe pressure in chamber 12 and the auxiliary reservoir pressure in chamber 14 being normally equal, the valve 16 will be held seated by spring 39.

If the brakes have been applied in the usual manner by effecting a reduction in brake pipe pressure, so that fluid under pressure is supplied from the auxiliary reservoir 6 to the brake cylinder 9, the release of the brakes may thereafter be graduated by increasing the brake pipe pressure a predetermined amount.

The triple valve piston is then shifted to release position, in which the brake cylinder 9 is connected by cavity 38 in slide valve 7 with passage 19 and the chamber 22.

The increase in brake pipe pressure in chamber 12 operates the diaphragm 11 to open the valve 16 and permit the flow of fluid from the supplemental reservoir 17 to passage 15 and the auxiliary reservoir 6, the flow continuing until the auxiliary reservoir pressure has been increased to substantially equal the increased brake pipe pressure, when the valve 16 will be moved to its seat by spring 39.

The increase in auxiliary reservoir pressure acts on the differential area of the diaphragm 26, and with the brake cylinder pressure acting in chamber 22 overcomes the pressure of the supplemental reservoir acting in chamber 28 on diaphragm 25.

The valve 24 is then lifted from its seat, permitting fluid to be released from chamber 22 and the brake cylinder 9.

When the brake cylinder pressure has been reduced a predetermined amount, the diaphragms move so as to permit the valve 24 to seat. The ratio of the reduction in brake cylinder pressure to the increase in auxiliary reservoir pressure being determined by the relative areas of the diaphragms 26 and 27.

The brake cylinder pressure may be further reduced by increasing the brake pipe pressure a further amount, so as to again operate the diaphragm 11 and open the valve 16. The further increase in auxiliary reservoir pressure then operates on the diaphragm 26 to open the valve 24 and permit a further release of fluid from the brake cylinder.

It will now be seen that fluid is released from the brake cylinder according as the auxiliary reservoir pressure is increased so that the auxiliary reservoir is recharged in proportion to the rate at which the fluid in the brake cylinder is released in graduating the release of the brakes.

By employing the diaphragm 25 subject to the pressure normally carried in the system as supplied to the reservoir 17, it will be seen that the device will operate at any desired standard of pressure carried in the brake pipe without the necessity for adjusting any of the parts.

Having now described my invention, what I claim as new and desire to secure by Letters Patent, is:

1. In a fluid pressure brake, the combination with a brake pipe, auxiliary reservoir, and brake cylinder, of means operated upon an increase in auxiliary reservoir pressure in releasing the brakes for releasing fluid from the brake cylinder.

2. In a fluid pressure brake, the combination with a brake pipe, auxiliary reservoir, and brake cylinder, of means operated upon an increase in brake pipe pressure for supplying fluid to the auxiliary reservoir and means operated according to the increase in auxiliary reservoir pressure for releasing fluid from the brake cylinder.

3. In a fluid pressure brake, the combination with a brake pipe, auxiliary reservoir, and brake cylinder, of means operated upon a predetermined increase in brake pipe pressure, in effecting the release of the brakes, for supplying fluid to the auxiliary reservoir and means operated according to the increase in auxiliary reservoir pressure for releasing fluid from the brake cylinder.

4. In a fluid pressure brake, the combination with a brake pipe, auxiliary reservoir, and brake cylinder, of two diaphragms of different areas subject to auxiliary reservoir pressure, one of said diaphragms being subject on its opposite side to brake cylinder pressure, a valve operated by said diaphragms for controlling the release of fluid from the brake cylinder, and means operated upon an increase in brake pipe pressure for supplying fluid to the auxiliary reservoir.

5. In a fluid pressure brake, the combination with a brake pipe, auxiliary reservoir, brake cylinder, and a supplemental reservoir adapted to be charged from the brake pipe, of two diaphragms of different areas subject to auxiliary reservoir pressure, one of said diaphragms being subject on its opposite side to brake cylinder pressure, a third diaphragm subject to the pressure in the supplemental reservoir opposing the brake cylinder pressure, and a valve operated by said diaphragms for controlling the release of fluid from the brake cylinder.

6. In a fluid pressure brake, the combination with a brake pipe, auxiliary reservoir, brake cylinder, and a supplemental reservoir adapted to be charged from the brake pipe, of two diaphragms of different areas subject to auxiliary reservoir pressure, one of said diaphragms being subject on its opposite side to brake cylinder pressure, a third diaphragm subject to the pressure in the supplemental reservoir opposing the brake cylinder pressure, a valve operated by said diaphragms for controlling the release of fluid from the brake cylinder, and means operated upon an increase in brake pipe pressure for supplying fluid to the auxiliary reservoir.

7. In a fluid pressure brake, the combination with a brake pipe, auxiliary reservoir, brake cylinder, and a supplemental reservoir adapted to be charged from the brake pipe, of two diaphragms of different areas subject to auxiliary reservoir pressure, one of said diaphragms being subject on its opposite side to brake cylinder pressure, a third diaphragm subject to the pressure in the supplemental reservoir opposing the brake cylinder pressure, a valve operated by said diaphragms for controlling the release of fluid from the brake cylinder, a diaphragm subject to the opposing pressures of the auxiliary reservoir and brake pipe, and a valve operated by said diaphragm for supplying fluid from the supplemental reservoir to the auxiliary reservoir.

In testimony whereof I have hereunto set my hand.

THOMAS H. THOMAS.